S. R. LÁLKÁKÁ.
WHEEL HUB.
APPLICATION FILED MAY 23, 1914.
1,155,493.
Patented Oct. 5, 1915.
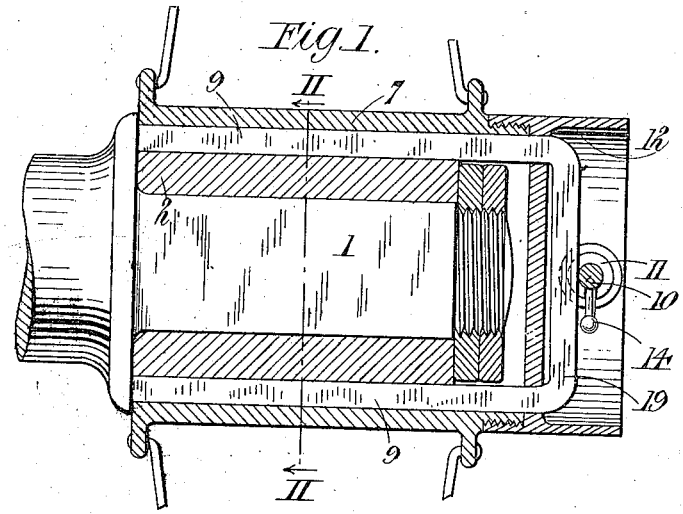
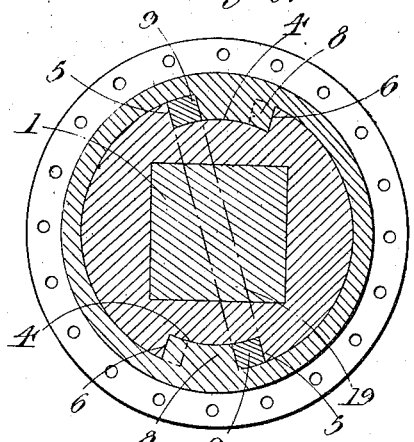
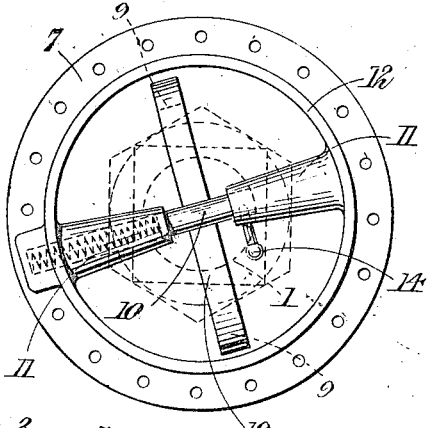
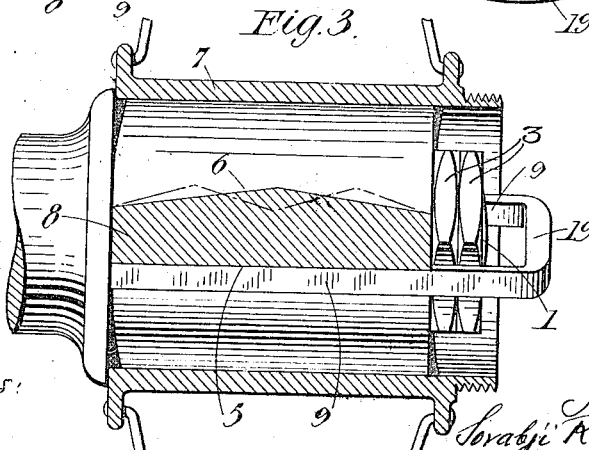
Witnesses:
Anna Hoyer
Elfrieda Farlow
Inventor.
Sorabji Ratanji Lalkaka

UNITED STATES PATENT OFFICE.

SORABJI RATANJI LÁLKÁKÁ, OF LONDON, ENGLAND.

WHEEL-HUB.

1,155,493.    Specification of Letters Patent.    Patented Oct. 5, 1915.

Application filed May 23, 1914. Serial No. 840,451.

*To all whom it may concern:*

Be it known that I, SORABJI RATANJI LÁLKÁKÁ, a subject of the Emperor of India, residing in London, England, have invented a certain new and useful Improved Wheel-Hub, of which the following is a specification.

This invention relates to detachable wheel hubs for vehicles, particularly for motor-cars.

According to the present invention the hub is divided into two concentric parts, one part being provided with teeth and the other with key-ways with which the teeth can engage. One side of each tooth is provided with projections which engage corresponding recesses in the walls of the key-ways, the greatest circumferential width of the teeth being equal to or less than the smallest width of the key-ways so as to allow the entry of the teeth into the key-ways, and the projections are held in engagement with the recesses by means of locking keys inserted between the straight sides of the teeth and the key-ways, said keys being held in place by suitable means such as spring pins. One of the two concentric parts is the shell of the hub, to which the spokes are attached, while the other is a boss firmly secured to the rotary axle, or rotatably mounted on the stub-axle, if applied to the front wheel of a motor vehicle.

In the accompanying drawings a construction suitable for the driving wheels of a motor-car is shown, Figure 1 being a side elevation partly in section, Fig. 2 a section on the line II—II in Fig. 1, Fig. 3 a plan partly in section, and Fig. 4 an end elevation.

The end 1 of the back axle is squared, and the boss 2 is fitted over this squared end and secured by nuts 3. The boss is provided with two opposed key-ways 4 one side 5 of each key-way being straight, and the other side 6 having a recess as shown in full lines. Of course more than one recess can be provided, as shown in dotted lines, and they can be of any shape.

The shell 7 is provided on its inner surface with teeth 8 having projections on one side exactly similar in shape to the recesses in the sides 6 of the key-ways 4, and the width across the widest part of the teeth is somewhat less than the width across the narrowest part of the key-ways, so as to allow of the entry of the teeth into the key-ways.

The locking keys are formed by the two prongs 9 of a U-shaped fork, and their width is such that when inserted between the sides 5 of the key-ways and the straight sides of the teeth, the projections on the latter are forced firmly into engagement with the recesses in the side 6 of the key-ways, thus locking the shell to the boss both laterally and as regards rotation.

The keys are held in place by means of a pin 10 sliding in bosses 11 provided on a hub-cap 12 having holes to allow of the passage of the keys 9. A spring 13 provided in one of the bosses keeps the pin 10 in position across the cross-bar 19 joining the keys 9 and a lifting-pin 14 screwed into the pin 10 and sliding in a slot cut in the boss, allows the pin 10 to be lifted to allow of the withdrawal of the keys.

In mounting the wheel, the shell is placed over the boss with the teeth engaging the key-ways, the wheel is turned slightly so as to cause the projections on the teeth to engage with the recesses in the key-ways, the pin 10 is lifted, the keys 9 inserted, and the pin 10 allowed to drop. The wheel will then be held positively on the axle, without any possibility of accidental loosening. To remove the wheel, the pin 10 is lifted, the keys withdrawn and the wheel turned backward so as to disengage the projections from the recesses, when it can be removed freely. If the invention is to be applied to the front wheels of a motor vehicle, the bosses 2 are of course rotatably mounted on the stub-axles.

What I claim as my invention and desire to secure by Letters Patent is:—

1. A detachable wheel hub comprising in combination two concentric hub-members one of which is provided with key-ways each having a side formed with recesses and another side straight and unrecessed, teeth narrower than said key-ways on the other hub-member adapted to enter the key-ways, projections on one side of each of said teeth adapted to engage the said recesses in the key-ways, locking keys adapted to be inserted between the straight sides of the teeth and of the key-ways to hold the projections in engagement with the recesses, and means for holding the locking-keys in place.

2. A detachable wheel hub comprising in combination a boss adapted to be fixed to the end of the rear axle of a motor vehicle and provided with key-ways each having a side formed with recesses and another side straight and unrecessed, a hub-shell adapted to be placed over the boss, teeth in said shell narrower than the key-ways and engaging therewith, projections on said teeth adapted to enter the said recesses in the key-ways, locking keys adapted to be inserted between the straight sides of the teeth and of the key-ways to hold the projections in engagement with the recesses, and means for holding the locking-keys in place.

3. A detachable wheel hub comprising in combination two concentric hub-members one of which is provided with key-ways each having a side formed with recesses and another side straight and unrecessed, teeth narrower than said key-ways on the other hub-member adapted to enter the key-ways, projections on one side of each of said teeth adapted to engage the said recesses in the key-ways, locking keys adapted to be inserted between the straight sides of the teeth and of the key-ways to hold the projections in engagement with the recesses, a cross-bar connecting the keys together, a pin adapted to lie across said cross-bar, a spring adapted to hold the pin in the operative position, and means for moving the pin out of the path of the cross-bar.

4. A detachable wheel hub comprising in combination a boss adapted to be fixed to the end of the rear axle of a motor vehicle and provided with key-ways each having a side formed with recesses and another side straight and unrecessed, a hub-shell adapted to be placed over the boss, teeth in said shell narrower than the key-ways and engaging therewith, projections on said teeth adapted to enter the said recesses in the key-ways, locking keys adapted to be inserted between the straight sides of the teeth and of the key-ways to hold the projections in engagement with the recesses, a cross-bar connecting the keys together, a pin adapted to lie across said cross-bar, a spring adapted to hold the pin in the operative position, and means for moving the pin out of the path of the cross-bar.

5. A detachable wheel hub comprising in combination a boss adapted to be fixed to the end of the rear axle of a motor vehicle and provided with key-ways each having a side formed with recesses and another side straight and unrecessed, a hub-shell adapted to be placed over the boss, teeth in said shell narrower than the key-ways and engaging therewith, projections on said teeth adapted to enter the said recesses in the key-ways, locking keys adapted to be inserted between the straight sides of the teeth and of the key-ways to hold the projections in engagement with the recesses, a hub-cap adapted to be screwed on the outer end of the hub-shell and having holes to allow the keys to pass, two opposed bosses in the outer part of said cap having coaxial holes, a pin sliding in said holes and having a lifting pin whereby it may be operated by hand, and a spring adapted to keep the pin in its operative position in the space between the two bosses.

In testimony whereof I have signed my name to this specification in the presence of two subscribing witnesses.

SORABJI RATANJI LÁLKÁKÁ.

Witnesses:
KAIKHASHRU H. SARYAU,
MAY J. ROBOTTOM.